(12) United States Patent
Mullette

(10) Patent No.: US 7,867,417 B2
(45) Date of Patent: Jan. 11, 2011

(54) MEMBRANE POST TREATMENT

(75) Inventor: Daniel Mullette, New South Wales (AU)

(73) Assignee: Siemens Water Technologies Corp., Warrendale, PA (US)

( * ) Notice: Subject to any disclaimer, the term of this patent is extended or adjusted under 35 U.S.C. 154(b) by 439 days.

(21) Appl. No.: 11/720,700

(22) PCT Filed: Dec. 2, 2005

(86) PCT No.: PCT/AU2005/001820

§ 371 (c)(1),
(2), (4) Date: Jun. 1, 2007

(87) PCT Pub. No.: WO2006/058384

PCT Pub. Date: Jun. 8, 2006

(65) Prior Publication Data

US 2009/0230053 A1 Sep. 17, 2009

(30) Foreign Application Priority Data

Dec. 3, 2004 (AU) ............................. 2004906947

(51) Int. Cl.
*B29C 65/00* (2006.01)
*B29C 67/20* (2006.01)
*B01D 71/28* (2006.01)
*B01D 39/00* (2006.01)

(52) U.S. Cl. .................. 264/49; 264/41; 210/500.36; 210/500.27; 210/500.42

(58) Field of Classification Search ............ 210/500.27, 210/500.42, 500.35, 500.23, 500.36, 500.41; 264/41, 48, 49, 177.13, 177.14; 428/36.5, 428/373, 30–4.4
See application file for complete search history.

(56) References Cited

U.S. PATENT DOCUMENTS

| | | | |
|---|---|---|---|
| 1,994,135 A | 3/1935 | Horowitz | |
| 2,658,045 A | 11/1953 | Schildknecht | |
| 3,228,876 A | 1/1966 | Mahon | |
| 3,275,554 A | 9/1966 | Wagenaar | |
| 3,556,305 A | 1/1971 | Shorr | |
| 3,625,827 A | 12/1971 | Wildi et al. | |
| 3,654,147 A | 4/1972 | Levin et al. | |
| 3,693,406 A | 9/1972 | Tobin, III | |
| 3,708,071 A | 1/1973 | Crowley | |
| 3,728,256 A | 4/1973 | Cooper | |
| 3,744,642 A * | 7/1973 | Scala et al. ............ | 210/500.21 |
| 3,864,289 A | 2/1975 | Rendall | |
| 3,876,738 A | 4/1975 | Marinaccio et al. | |
| 3,968,192 A | 7/1976 | Hoffman, III et al. | |
| 3,992,301 A | 11/1976 | Shippey et al. | |
| 3,993,816 A | 11/1976 | Baudet et al. | |
| 4,188,817 A | 2/1980 | Steigelmann | |
| 4,192,750 A | 3/1980 | Elfes et al. | |
| 4,193,780 A | 3/1980 | Cotton, Jr. et al. | |
| 4,203,848 A | 5/1980 | Grandine, II | |
| 4,218,324 A | 8/1980 | Hartmann et al. | |
| 4,230,583 A | 10/1980 | Chiolle et al. | |
| 4,247,498 A | 1/1981 | Castro | |
| 4,248,648 A | 2/1981 | Kopp | |
| 4,253,936 A | 3/1981 | Leysen et al. | |
| 4,302,336 A | 11/1981 | Kawaguchi et al. | |
| 4,340,479 A | 7/1982 | Pall | |
| 4,353,802 A | 10/1982 | Hara et al. | |
| 4,354,443 A | 10/1982 | Abrahamson | |
| 4,384,474 A | 5/1983 | Kowalski | |
| 4,385,150 A | 5/1983 | Miyake et al. | |
| 4,388,189 A | 6/1983 | Kawaguchi et al. | |
| 4,407,975 A | 10/1983 | Yamaguchi | |
| 4,431,545 A | 2/1984 | Pall et al. | |
| 4,451,369 A | 5/1984 | Sekino et al. | |
| 4,511,471 A | 4/1985 | Müller | |
| 4,519,909 A | 5/1985 | Castro | |
| 4,540,490 A | 9/1985 | Shibata et al. | |
| 4,547,289 A | 10/1985 | Okano et al. | |
| 4,609,465 A | 9/1986 | Miller | |
| 4,614,109 A | 9/1986 | Hofmann | |
| 4,618,533 A * | 10/1986 | Steuck .................... | 428/315.7 |
| 4,623,670 A | 11/1986 | Mutoh et al. | |
| 4,623,690 A | 11/1986 | Patzschke et al. | |
| 4,629,563 A | 12/1986 | Wrasidlo | |

(Continued)

FOREIGN PATENT DOCUMENTS

AU 2005312347 B2 3/2010

(Continued)

OTHER PUBLICATIONS

Supplemental European Search Report dated Jun. 11, 2008 for Application No. EP 05 81 3412.

(Continued)

*Primary Examiner*—Ana M Fortuna
(74) *Attorney, Agent, or Firm*—Lando & Anastasi LLP

(57) ABSTRACT

Hydrophilic porous polymeric membranes with high permeabilities, and processes for the preparation thereof are disclosed. Membranes may be prepared by including a preferably hydrophilic cross-linkable component such as PVP (either by inclusion into the polymer dope prior to casting, or coating or quenching cast membranes); and treating the polymeric microfiltration or ultrafiltration membrane with a crosslinking agent to cross-link said cross-linkable component. Preferred cross-linking agents include Fenton's reagent.

23 Claims, No Drawings

U.S. PATENT DOCUMENTS

| | | |
|---|---|---|
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,656,865 A | 4/1987 | Callan |
| 4,660,411 A | 4/1987 | Reid |
| 4,670,145 A | 6/1987 | Edwards |
| 4,673,507 A | 6/1987 | Brown |
| 4,687,561 A | 8/1987 | Kunz |
| 4,688,511 A | 8/1987 | Gerlach et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,756,875 A | 7/1988 | Tajima et al. |
| 4,763,612 A | 8/1988 | Iwanami |
| 4,767,539 A | 8/1988 | Ford |
| 4,775,471 A | 10/1988 | Nagai et al. |
| 4,779,448 A | 10/1988 | Gogins |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,810,384 A | 3/1989 | Fabre |
| 4,812,235 A | 3/1989 | Seleman et al. |
| 4,816,160 A | 3/1989 | Ford et al. |
| 4,840,227 A | 6/1989 | Schmidt |
| 4,846,970 A | 7/1989 | Bertelsen et al. |
| 4,855,163 A | 8/1989 | Joffee et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,904,426 A | 2/1990 | Lundgard et al. |
| 4,921,610 A | 5/1990 | Ford et al. |
| 4,931,186 A | 6/1990 | Ford et al. |
| 4,935,143 A | 6/1990 | Kopp et al. |
| 4,963,304 A | 10/1990 | Im et al. |
| 4,968,733 A | 11/1990 | Muller et al. |
| 4,999,038 A | 3/1991 | Lundberg |
| 5,005,430 A | 4/1991 | Kibler et al. |
| 5,015,275 A | 5/1991 | Beck et al. |
| 5,017,292 A * | 5/1991 | DiLeo et al. ................ 210/645 |
| 5,019,260 A | 5/1991 | Gsell et al. |
| 5,024,762 A | 6/1991 | Ford et al. |
| 5,032,282 A | 7/1991 | Linder et al. ................ 210/651 |
| 5,043,113 A | 8/1991 | Kafchinski et al. |
| 5,049,275 A | 9/1991 | Gillberg-Laforce et al. ................ 210/500.35 |
| 5,066,375 A | 11/1991 | Parsi et al. |
| 5,066,401 A | 11/1991 | Müller et al. |
| 5,066,402 A | 11/1991 | Anselme et al. |
| 5,069,065 A | 12/1991 | Sprunt et al. |
| 5,075,065 A | 12/1991 | Effenberger et al. |
| 5,076,925 A | 12/1991 | Roesink et al. |
| 5,079,272 A | 1/1992 | Allegrezza et al. |
| 5,094,750 A | 3/1992 | Kopp et al. |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,137,633 A | 8/1992 | Wang ........................ 210/490 |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,158,721 A | 10/1992 | Allegrezza, Jr. et al. |
| 5,182,019 A | 1/1993 | Cote et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,269,084 A | 12/1993 | Best et al. |
| 5,275,766 A | 1/1994 | Gadkaree et al. |
| 5,286,324 A | 2/1994 | Kawai et al. |
| 5,288,324 A | 2/1994 | Shaneyfelt |
| 5,297,420 A | 3/1994 | Gilliland et al. |
| 5,320,760 A | 6/1994 | Freund et al. |
| 5,353,630 A | 10/1994 | Soda et al. |
| 5,354,587 A | 10/1994 | Abayasekara ............... 428/36.6 |
| 5,361,625 A | 11/1994 | Ylvisaker |
| 5,364,527 A | 11/1994 | Zimmerman et al. |
| 5,376,274 A | 12/1994 | Muller et al. |
| 5,389,260 A | 2/1995 | Hemp et al. |
| 5,396,019 A | 3/1995 | Sartori et al. |
| 5,401,401 A | 3/1995 | Hickok et al. |
| 5,403,479 A | 4/1995 | Smith et al. |
| 5,403,483 A | 4/1995 | Hayashida et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,451,317 A | 9/1995 | Ishida et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,491,023 A | 2/1996 | Tsai et al. |
| 5,525,220 A | 6/1996 | Yagi et al. |
| 5,531,848 A | 7/1996 | Brinda et al. |
| 5,531,900 A | 7/1996 | Raghaven et al. |
| 5,543,002 A | 8/1996 | Brinda et al. |
| 5,543,465 A | 8/1996 | Bell et al. |
| 5,547,575 A * | 8/1996 | Demmer et al. ............. 210/490 |
| 5,554,283 A | 9/1996 | Brinda et al. |
| 5,607,593 A | 3/1997 | Cote et al. |
| 5,629,084 A | 5/1997 | Moya |
| 5,639,373 A | 6/1997 | Mahendran et al. |
| 5,643,455 A | 7/1997 | Kopp et al. |
| 5,647,988 A | 7/1997 | Kawanishi et al. |
| 5,725,769 A * | 3/1998 | Miller et al. ........... 210/500.39 |
| 5,747,605 A | 5/1998 | Breant et al. |
| D396,046 S | 7/1998 | Scheel et al. |
| 5,783,083 A | 7/1998 | Henshaw et al. |
| D396,726 S | 8/1998 | Sadr et al. |
| D400,890 S | 11/1998 | Gambardella |
| 5,871,823 A | 2/1999 | Anders et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,958,243 A | 9/1999 | Lawrence et al. |
| 5,981,614 A | 11/1999 | Adiletta |
| 5,988,400 A | 11/1999 | Karachevtcev et al. |
| 6,024,872 A | 2/2000 | Mahendran |
| 6,039,872 A | 3/2000 | Wu et al. |
| 6,042,677 A | 3/2000 | Mahendran et al. |
| 6,045,698 A | 4/2000 | Cöté et al. |
| 6,045,899 A | 4/2000 | Wang et al. |
| 6,048,454 A | 4/2000 | Jenkins |
| 6,074,718 A | 6/2000 | Puglia et al. |
| 6,077,435 A | 6/2000 | Beck et al. |

| | | | | | | |
|---|---|---|---|---|---|---|
| 6,083,393 | A | 7/2000 | Wu et al. | 7,128,768 | B2 | 10/2006 Liu |
| 6,096,213 | A | 8/2000 | Radovanovic et al. | 7,226,541 | B2 | 6/2007 Muller et al. |
| 6,113,794 | A | 9/2000 | Kumara et al. ............... 216/650 | 7,300,022 | B2 | 11/2007 Muller |
| 6,146,747 | A | 11/2000 | Wang et al. | 7,395,646 | B2 | 7/2008 Salman |
| 6,156,200 | A | 12/2000 | Zha et al. | 7,404,896 | B2 | 7/2008 Muller |
| 6,159,373 | A | 12/2000 | Beck et al. | 7,449,112 | B2 | 11/2008 Lee et al. |
| 6,193,890 | B1 | 2/2001 | Pedersen et al. | 7,459,085 | B2 * | 12/2008 Koguma et al. ............. 210/645 |
| 6,202,475 | B1 | 3/2001 | Selbie et al. | 7,537,718 | B2 | 5/2009 Mezhirov et al. |
| 6,214,231 | B1 | 4/2001 | Cote et al. | 7,648,034 | B2 | 1/2010 Charkoudian et al. |
| 6,221,247 | B1 | 4/2001 | Nemser et al. | 2002/0148767 | A1 | 10/2002 Johnson et al. |
| 6,245,239 | B1 | 6/2001 | Cote et al. | 2003/0065302 | A1 | 4/2003 Kuroda |
| 6,254,773 | B1 | 7/2001 | Biltoft | 2003/0178365 | A1 | 9/2003 Zha et al. |
| 6,264,839 | B1 | 7/2001 | Mohr et al. | 2003/0226797 | A1 | 12/2003 Phelps |
| 6,277,512 | B1 | 8/2001 | Hamrock et al. | 2004/0084369 | A1 | 5/2004 Zha et al. |
| 6,280,626 | B1 | 8/2001 | Miyashita et al. | 2004/0085300 | A1 | 5/2004 Matusis |
| 6,284,135 | B1 | 9/2001 | Ookata | 2004/0092901 | A1 | 5/2004 Reeca |
| 6,294,039 | B1 | 9/2001 | Mahendran et al. | 2004/0145076 | A1 | 7/2004 Zha et al. |
| 6,299,773 | B1 | 10/2001 | Takamura et al. | 2004/0167490 | A1 | 8/2004 Nelson |
| 6,315,895 | B1 | 11/2001 | Summerton et al. | 2004/0167493 | A1 | 8/2004 Jarpenberg |
| 6,322,703 | B1 | 11/2001 | Taniguchi et al. | 2004/0168947 | A1 | 9/2004 McDonald |
| 6,325,928 | B1 | 12/2001 | Pedersen et al. | 2004/0172002 | A1 | 9/2004 Nelson |
| 6,337,018 | B1 | 1/2002 | Mickols | 2004/0176735 | A1 | 9/2004 Snell |
| RE37,549 | E | 2/2002 | Mahendran et al. | 2004/0195172 | A1 | 10/2004 Yeh et al. .................... 210/490 |
| 6,354,444 | B1 | 3/2002 | Mahendran | 2004/0217053 | A1 | 11/2004 Zha et al. |
| 6,355,730 | B1 * | 3/2002 | Kozawa et al. ............... 525/189 | 2005/0015052 | A1 | 1/2005 Klippen |
| 6,375,848 | B1 | 4/2002 | Cote et al. | 2005/0032982 | A1 | 2/2005 Muller |
| 6,423,784 | B1 | 7/2002 | Hamrock et al. | 2005/0098494 | A1 | 5/2005 Mullette et al. |
| 6,440,303 | B2 | 8/2002 | Spriegel | 2006/0157404 | A1 | 7/2006 Mullette et al. |
| D462,699 | S | 9/2002 | Johnson et al. | 2006/0178480 | A1 | 8/2006 Tada et al. |
| 6,448,062 | B1 | 9/2002 | Huth et al. | 2007/0007197 | A1 | 1/2007 Mahendran et al. |
| 6,465,748 | B2 * | 10/2002 | Yamanashi et al. .......... 174/262 | | | |
| 6,491,165 | B2 | 12/2002 | Kuske | | | FOREIGN PATENT DOCUMENTS |
| 6,495,041 | B2 | 12/2002 | Taniguchi et al. | CN | 1135188 A | 11/1996 |
| 6,524,481 | B2 | 2/2003 | Zha et al. | CN | 1552507 | 12/2004 |
| 6,550,747 | B2 | 4/2003 | Rabie et al. | DE | 3904544 A1 | 8/1990 |
| 6,555,005 | B1 | 4/2003 | Zha et al. | DE | 4007383 A | 9/1991 |
| 6,595,167 | B2 * | 7/2003 | Kaesgen .................... 123/55.2 | DE | 4117281 A1 | 1/1992 |
| 6,596,167 | B2 * | 7/2003 | Ji et al. .................. 210/500.42 | DE | 4113420 A1 | 10/1992 |
| D478,913 | S | 8/2003 | Johnson et al. | DE | 4117422 C1 | 11/1992 |
| 6,620,319 | B2 | 9/2003 | Behmann et al. | DE | 19503060 | 8/1996 |
| 6,635,104 | B2 | 10/2003 | Komkova et al. | DE | 29906389 | 6/1999 |
| 6,635,179 | B1 | 10/2003 | Summerton et al. | EP | 012557 B1 | 2/1983 |
| 6,641,733 | B2 | 11/2003 | Zha et al. | EP | 050447 B1 | 10/1985 |
| 6,645,374 | B2 | 11/2003 | Cote et al. | EP | 229019 B1 | 7/1987 |
| 6,656,356 | B2 | 12/2003 | Gungerich et al. | EP | 250337 A1 | 12/1987 |
| 6,682,652 | B2 | 1/2004 | Mahendran et al. | EP | 261734 A1 | 3/1988 |
| 6,685,832 | B2 | 2/2004 | Mahendran et al. | EP | 407900 A2 | 1/1991 |
| 6,705,465 | B2 | 3/2004 | Ling | EP | 419396 A1 | 3/1991 |
| 6,721,529 | B2 | 4/2004 | Chen et al. | EP | 463627 A2 | 1/1992 |
| 6,723,758 | B2 | 4/2004 | Stone et al. | EP | 492942 A2 | 7/1992 |
| 6,727,305 | B1 | 4/2004 | Pavez Aranguiz | EP | 509663 B2 | 10/1992 |
| 6,761,013 | B2 | 7/2004 | Tippey | EP | 550798 A1 | 7/1993 |
| 6,770,202 | B1 | 8/2004 | Kidd et al. | EP | 395133 B1 | 2/1995 |
| 6,783,008 | B2 | 8/2004 | Zha et al. | EP | 492446 B1 | 11/1995 |
| 6,790,912 | B2 | 9/2004 | Blong | EP | 430082 B1 | 6/1996 |
| 6,793,820 | B1 | 9/2004 | McCray et al. ........ 210/500.23 | EP | 581168 | 10/1996 |
| 6,811,696 | B2 | 11/2004 | Wang et al. | EP | 763758 A1 | 3/1997 |
| 6,821,420 | B2 | 11/2004 | Zha et al. | EP | 911073 A1 | 4/1999 |
| 6,830,782 | B2 | 12/2004 | Kanazawa | EP | 920904 A2 | 6/1999 |
| 6,851,259 | B2 | 2/2005 | Simburger | EP | 1034835 A1 | 9/2000 |
| 6,861,466 | B2 | 3/2005 | Dadalas et al. | EP | 1052012 A1 | 11/2000 |
| 6,872,305 | B2 | 3/2005 | Johnson et al. | EP | 1236503 B1 | 8/2004 |
| 6,884,350 | B2 | 4/2005 | Muller | FR | 2620712 | 3/1989 |
| 6,884,375 | B2 | 4/2005 | Wang et al. | FR | 2674448 | 10/1992 |
| 6,890,435 | B2 | 5/2005 | Ji et al. | FR | 2850297 A1 | 7/2004 |
| 6,890,645 | B2 | 5/2005 | Disse et al. | GB | 702911 | 1/1954 |
| 6,893,568 | B1 | 5/2005 | Janson et al. | GB | 2253572 A | 9/1992 |
| 6,965,033 | B2 | 11/2005 | Jiang | GB | 2390042 A | 12/2003 |
| 6,969,465 | B2 | 11/2005 | Zha et al. | JP | 55-129155 | 6/1980 |
| 6,974,554 | B2 | 12/2005 | Cox et al. | JP | 58-088007 | 5/1983 |
| 6,994,867 | B1 | 2/2006 | Hossainy et al. | JP | 60-260628 | 12/1985 |
| 7,041,728 | B2 | 5/2006 | Zipplies et al. | JP | 61-097006 | 5/1986 |
| 7,070,909 | B2 * | 7/2006 | Japp et al. .................... 430/311 | | | |

| | | |
|---|---|---|
| JP | 61-107905 | 5/1986 |
| JP | 61-192309 | 8/1986 |
| JP | 61-257203 | 11/1986 |
| JP | 61-263605 | 11/1986 |
| JP | 62-004408 | 1/1987 |
| JP | 62-068828 | 3/1987 |
| JP | 62-114609 | 5/1987 |
| JP | 62-140607 | 6/1987 |
| JP | 62-179540 | 8/1987 |
| JP | 62-250908 | 10/1987 |
| JP | 63-097634 | 4/1988 |
| JP | S63-38884 | 10/1988 |
| JP | 06-027215 | 3/1989 |
| JP | 10-75542 | 3/1989 |
| JP | 01-307409 | 12/1989 |
| JP | 02-031200 | 2/1990 |
| JP | 02-144132 | 6/1990 |
| JP | 02-164423 | 6/1990 |
| JP | 02-284035 | 11/1990 |
| JP | 03-018373 | 1/1991 |
| JP | 03-110445 | 5/1991 |
| JP | 04-187224 | 7/1992 |
| JP | 04-250898 | 9/1992 |
| JP | 04-265128 | 9/1992 |
| JP | 04-310223 | 11/1992 |
| JP | 05-023557 | 2/1993 |
| JP | 05-096136 | 4/1993 |
| JP | 05131124 A | 5/1993 |
| JP | 05-157654 | 6/1993 |
| JP | 05-285348 | 11/1993 |
| JP | 06-071120 | 3/1994 |
| JP | 06-114240 | 4/1994 |
| JP | 06-218237 | 8/1994 |
| JP | 06-285496 | 10/1994 |
| JP | 06-343837 | 12/1994 |
| JP | 07-000770 | 1/1995 |
| JP | 07-024272 | 1/1995 |
| JP | 07-155758 | 6/1995 |
| JP | 07-185268 | 7/1995 |
| JP | 07-185271 | 7/1995 |
| JP | 07-275665 | 10/1995 |
| JP | 08-010585 | 1/1996 |
| JP | 09-141063 | 6/1997 |
| JP | 09-220569 | 8/1997 |
| JP | 09-324067 | 12/1997 |
| JP | 10-156149 | 6/1998 |
| JP | 11-165200 | 6/1999 |
| JP | 11-302438 | 11/1999 |
| JP | 2000-342932 | 12/2002 |
| JP | 2004230280 | 8/2004 |
| JP | 2005154551 | 6/2005 |
| KR | 2002031017 | 7/2002 |
| WO | WO 88-06200 | 8/1988 |
| WO | WO 90-00434 | 1/1990 |
| WO | 9117204 | 11/1991 |
| WO | WO 93-02779 | 2/1993 |
| WO | WO 93-15827 | 8/1993 |
| WO | WO 95-34424 | 12/1995 |
| WO | WO 96-07470 A2 | 3/1996 |
| WO | WO 96-41676 | 12/1996 |
| WO | WO 98-22204 | 5/1998 |
| WO | WO 98-25694 | 6/1998 |
| WO | WO 98-28066 | 7/1998 |
| WO | WO 99-01207 | 1/1999 |
| WO | WO0043115 A1 | 7/2000 |
| WO | WO0238256 A1 | 5/2002 |
| WO | 02087734 | 11/2002 |
| WO | WO 03068374 | 8/2003 |
| WO | WO 03080228 | 10/2003 |
| WO | 03095078 | 11/2003 |
| WO | WO 2004078327 A | 9/2004 |
| WO | WO 2004094049 A | 11/2004 |
| WO | 2005005028 | 1/2005 |
| WO | WO2005002712 A1 | 1/2005 |
| WO | WO 2005030916 A3 | 4/2005 |
| WO | 2006002479 | 1/2006 |
| WO | WO 2006058384 A1 | 6/2006 |
| WO | 2006058394 | 8/2006 |

OTHER PUBLICATIONS

International Search Report dated Feb. 10, 2006 for Application No. PCT/AU2005/001820.

Almulla et al., Desalination, 153 (2002), pp. 237-243.

Anonymous, "Nonwoven Constructions of Dyneon™ THV and Dyneon™ THE Fluorothermoplastics", Research Disclosure Journal, Apr. 1999, RD 420013, 2 pages.

Hall, R. (1982) Peroxides and Peroxy Compounds, Inorganic, in Kirk-Othmer Encyclopedia of Chemical Technology, vol. 17, $3^{rd}$ edition, John Wiley & Sons, p. 14-16.

Johnson, "Recent Advances in Microfiltration for Drinking Water Treatment," AWWA Annual Conference, Jun. 20-24, 1999, Chicago, Illinois, entire publication.

Kaiya et al., "Water Purification Using Hollow Fiber Microfiltration Membranes," 6th World Filtration Congress, Nagoya, 1993, pp. 813-816.

Kolthoff, I.M., et al., "The Chemistry of Persulfate—The Kinetics and Mechanism of the Decomposition of the Persulfate Ion in Aqueous Medium", Journal of the American Chemical Society, Jul. 1951, vol. 73, pp. 3055-3059.

Lloyd, D.R. et al. "Microporous Membrane Formation Via Thermally Induced Phase Separation/Solid-Liquid Phase Separation" *Journal of Membrane Science* (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Ramaswammy S. et al. "Fabrication of Ply (ECTFE) Membranes via thermally induced phase Separation", *Journal of Membrane Science*, (Dec. 1, 2002), pp. 175-180, vol. 210 No. 1, Scientific Publishing Company, Amsterdam, NL.

Rosenberger et al., Desalination, 151 (2002), pp. 195-200.

Ueda et al., "Effects of Aeration on Suction Pressure in a Submerged Membrane Bioreactor," Wat. Res. vol. 31, No. 3, 1997, pp. 489-494.

White et al., *The Chemical Engineering Journal*, 52 (1993), pp. 73-77.

Zenon, "Proposal for ZeeWeed® Membrane Filtration Equipment System for the City of Westminster, Colorado, Proposal No. 479-99," Mar. 2000, entire publication.

Dupont Oxone Monopersulfate Compound, product literature (2008) pp. 1-3. http://ww2.dupont.com/Oxone/en_US/assets/downloads/K20101%20Oxone%20General%20Info.pdf.

International Search Report dated Sep. 13, 2005 for PCT Application No. PCT/AU2005/000961.

Extended European Search Report dated Mar. 3, 2009 for European Patent Application No. 0575700.

International Search Report dated Sep. 30, 2005 for Application No. PCT/AU2005/000975.

International Preliminary Report on Patentability dated Jun. 30, 2006 for Application No. PCT/AU2005/000975.

International Search Report dated Aug. 16, 2006 for Application No. PCT/AU2006/000997.

International Preliminary Report on Patentability dated Jun. 8, 2007 for Application No. PCT/AU2006/000997.

International Preliminary Report on Patentability dated Jul. 12, 2006 for Application No. PCT/AU2006/000864.

International Preliminary Report on Patentability dated Feb. 10, 2006 for Application No. PCT/AU2005/001820.

Ebewele et al.,"Polymer Science and Technology," p. 445.

Houghman et al, "Fluoropolymers: Synthesis," p. 92.

Smolders et al., "Liquid-liquid phase separation in concentrated solutions of non-crystallizable polymers by spinodal decomposition," Kolloid-Z. u. Polymere, 243, 14-20 (1971).

Supplementary EP Search Report dated Apr. 15, 2010 for European Application No. EP 06 74 1265.

Supplementary EP Search Report dated Nov. 25, 2009 for European Application No. EP 06 76 0859.

Chinese Office Action dated Apr. 21, 2010 for Chinese Application No. 200680022006.2.

* cited by examiner

MEMBRANE POST TREATMENT

TECHNICAL FIELD

The invention relates to the treatment of polymeric materials to enhance their chemical properties in ultrafiltration and microfiltration applications. In particular, the invention relates to the treatment of porous polymeric membranes to increase water permeability without loss of other desirable membrane characteristics.

BACKGROUND ART

The following discussion is not to be construed as an admission with regard to the state of the common general knowledge of those skilled in the art.

Synthetic polymeric membranes are well known in the field of ultrafiltration and microfiltration for a variety of applications including desalination, gas separation, filtration and dialysis. The properties of the membranes vary depending on the morphology of the membrane i.e. properties such as symmetry, pore shape, pore size and the chemical nature of the polymeric material used to form the membrane.

Different membranes can be used for specific separation processes, including microfiltration, ultrafiltration and reverse osmosis. Microfiltration and ultrafiltration are pressure driven processes and are distinguished by the size of the particle or molecule that the membrane is capable of retaining or passing. Microfiltration can remove very fine colloidal particles in the micrometer and submicrometer range. As a general rule, microfiltration can filter particles down to 0.05 μm, whereas ultrafiltration can retain particles as small as 0.01 μm and smaller. Reverse osmosis operates on an even smaller scale.

Microporous phase inversion membranes are particularly well suited to the application of removal of viruses and bacteria.

A large surface area is needed when a large filtrate flow is required. A commonly used technique to minimize the size of the apparatus used is to form a membrane in the shape of a hollow porous fibre. A large number of these hollow fibres (up to several thousand) are bundled together and housed in modules. The fibres act in parallel to filter a solution for purification, generally water, which flows in contact with the outer surface of all the fibres in the module. By applying pressure, the water is forced into the central channel, or lumen, of each of the fibres while the microcontaminants remain trapped outside the fibres. The filtered water collects inside the fibres and is drawn off through the ends.

The fibre module configuration is a highly desirable one as it enables the modules to achieve a very high surface area per unit volume.

In addition to the arrangement of fibres in a module, it is also necessary for the polymeric fibres themselves to possess the appropriate microstructure to allow microfiltration to occur.

Desirably, the microstructure of ultrafiltration and microfiltration membranes is asymmetric, that is, the pore size gradient across the membrane is not homogeneous, but rather varies in relation to the cross-sectional distance within the membrane. Hollow fibre membranes are preferably asymmetric membranes possessing tightly bunched small pores on one or both outer surfaces and larger more open pores towards the inside edge of the membrane wall.

This microstructure has been found to be advantageous as it provides a good balance between mechanical strength and filtration efficiency.

As well as the microstructure, the chemical properties of the membrane are also important. The hydrophilic or hydrophobic nature of a membrane is one such important property.

Hydrophobic surfaces are defined as "water hating" and hydrophilic surfaces as "water loving". Many of the polymers used to cast porous membranes are hydrophobic polymers. Water can be forced through a hydrophobic membrane by use of sufficient pressure, but the pressure needed is very high (150-300 psi), and a membrane may be damaged at such pressures and generally does not become wetted evenly.

Hydrophobic microporous membranes are typically characterised by their excellent chemical resistance, biocompatibility, low swelling and good separation performance. Thus, when used in water filtration applications, hydrophobic membranes need to be hydrophilised or "wet out" to allow water permeation. Some hydrophilic materials are not suitable for microfiltration and ultrafiltration membranes that require mechanical strength and thermal stability since water molecules can play the role of plasticizers.

Currently, poly(tetrafluoroethylene) (PTFE), polyethylene (PE), polypropylene (PP) and poly(vinylidene fluoride) (PVDF) are the most popular and available hydrophobic membrane materials. However, the search continues for membrane materials which will provide better chemical stability and performance while retaining the desired physical properties required to allow the membranes to be formed and worked in an appropriate manner. In particular, it is desirable to render membranes more hydrophilic to allow for greater filtration performance.

Microporous synthetic membranes are particularly suitable for use in hollow fibres and are produced by phase inversion. In this process, at least one polymer is dissolved in an appropriate solvent and a suitable viscosity of the solution is achieved. The polymer solution can be cast as a film or hollow fibre, and then immersed in precipitation bath such as water. This causes separation of the homogeneous polymer solution into a solid polymer and liquid solvent phase. The precipitated polymer forms a porous structure containing a network of uniform pores. Production parameters that affect the membrane structure and properties include the polymer concentration, the precipitation media and temperature and the amount of solvent and non-solvent in the polymer solution. These factors can be varied to produce microporous membranes with a large range of pore sizes (from less than 0.1 to 20 μm), and possess a variety of chemical, thermal and mechanical properties.

Hollow fibre ultrafiltration and microfiltration membranes are generally produced by either diffusion induced phase separation (the DIPS process) or by thermally induced phase separation (the TIPS process).

The TIPS process is described in more detail in PCT AU94/00198 (WO 94/17204) AU 653528, the contents of which are incorporated herein by reference. The quickest procedure for forming a microporous system is thermal precipitation of a two component mixture, in which the solution is formed by dissolving a thermoplastic polymer in a solvent which will dissolve the polymer at an elevated temperature but will not do so at lower temperatures. Such a solvent is often called a latent solvent for the polymer. The solution is cooled and, at a specific temperature which depends upon the rate of cooling, phase separation occurs and the polymer rich phase separates from the solvent.

Microporous polymeric ultrafiltration and microfiltration membranes have been made from PVdF which incorporate a hydrophilising copolymer to render the membrane hydrophilic. While these copolymers do impart a degree of hydrophilicity to otherwise hydrophobic membranes, membranes formed from mixed polymers usually have a lower water permeability than equivalent hydrophobic PVdF membranes formed without copolymer. Further, in some cases, the hydrophilising components can be leached from the membrane over time.

Previous attempts to hydrophilise membranes formed from principally hydrophobic material have involved preparing hydrophobic membranes and subsequently coating these with a suitable hydrophilic material. More advanced forms of this process have involved attempts to chemically bond the hydrophilic coating to the hydrophobic membrane substrate by processes such as cross-linking. While these processes do lead to the introduction of a hydrophilic membrane in most cases, they suffer from the drawback that the resultant membranes often have reduced permeability. That is, previous attempts to hydrophilise membranes by crosslinking have led to reduced membrane permeabilities.

Additional attempts have involved the preparation of polymeric blends containing a hydrophilic reactable component, followed by reaction of the component subsequent to membrane formation. Again, these have resulted in porous polymeric membranes with some desired properties, however, such process result in porous polymeric membranes which are generally of low permeability In the present case the inventors have sought to find a way to hydrophilise membranes made from normally hydrophobic polymer such PVdF to enhance the range of applications in which they may be used, while at the same time, retaining or improving upon the performance properties of the membrane, such the good intrinsic resistance of hydrophobic materials to chemical, physical and mechanical degradation and more particularly, to retain or enhance the water permeability of the membrane.

It is an object of the present invention to overcome or ameliorate at least one of the disadvantages of the prior art, or to provide a useful alternative, particularly in terms of methods of production.

DESCRIPTION OF THE INVENTION

In a first aspect, the invention provides a method of improving the permeability of porous polymeric membrane which includes a cross linkable component, said method including the step of treating said hydrophilic porous polymeric membrane with a cross linking agent.

Preferably, the porous polymeric membrane is a hydrophilic porous polymeric membrane. Preferably the cross linkable component is a hydrophilic cross linkable component.

As stated, prior art examples involving crosslinking of one or more membrane components typically have permeability going down when a cross-linkable component is used. Further, the methods of the prior art usually describe depositing a cross-linkable component onto the surface of the membrane and cross-linking it rather than having it incorporated into the dope mixture, where it is cast with the other membrane forming components into a membrane. The cross-linkable and non-crosslinkable components are preferably intimately mixed.

According to a second aspect, the invention provides a method of forming a hydrophilic polymeric microfiltration or ultrafiltration membrane including:
i) preparing a polymeric microfiltration or ultrafiltration membrane which contains a component which is cross-linkable; and
ii) treating said polymeric microfiltration or ultrafiltration membrane with a crosslinking agent to cross-link said cross-linkable component Preferably, the polymeric microfiltration or ultrafiltration membrane also includes a hydrophobic and/or not crosslinkable component.

Preferably, the hydrophilic cross-linkable component is any hydrophilic cross linkable component capable of free radical cross linking. More preferably, the cross linkable component is capable of cross linking under oxidative conditions. Even more particularly preferred are components capable of crosslinking in the presence of hydroxyl radicals. Examples of suitable cross linkable components include monomers, oligomers, polymers and copolymers of one or more of the following: vinyl pyrrolidone, vinyl acetate, vinyl alcohol, vinyl methyl ether, vinyl ethyl ether, acrylic acid, methyl acrylate, ethyl acrylate, propyl acrylate, butyl acrylate, methyl methacrylate, ethyl methacrylate propyl methacrylate, butyl methacrylate and maleic anhydride.

Especially preferred are poly(vinyl pyrrolidone), poly(vinyl acetate) or copolymers of vinyl pyrrolidone and vinyl acetate.

The cross linkable component may be added at various stages in the preparation of the polymer, but are usually incorporated by addition into the polymer dope in membranes prior to casting. Alternatively, the cross linkable component may be added as a coating/lumen or quench during membrane formation. They may be added in any amount, from an amount constituting the whole of the membrane or substantially the whole of the membrane down to an amount which produces only a minimal attenuation of the hydrophilicity/hydrophobicity balance.

Preferably, the hydrophobic and/or non-cross linkable component is any polymer or copolymer of oxidation resistant material. Any polymer resistant to base attack containing one or more of the following monomers may be used: chlorotrifluoroethylene, vinyl fluoride, vinyl chloride; vinylidene fluoride/vinylidene chloride/; hexafluoropropylene, ethylene-chlorotrifluoroethlyene, tetrafluoroethylene. Particularly preferred as a non crosslinkable component is PVdF.

Chemical crosslinking is preferred. Particularly preferred as a method of cross linking is treating the polymeric ultrafiltration or microfiltration membrane with a hydroxyl radical. The hydroxyl radical may be prepared by any known source. The generation of hydroxyl radicals may, for example, be by way of an aqueous solution of Ferric chloride/hydrogen peroxide/sodium hydrogensulfate, by aqueous acidified hydrogen peroxide, by aqueous organic peroxy acids such as peracetic acid or by aqueous hydrogen peroxide under ultraviolet radiation, or by a combination of hydrogen peroxide and ozone, with or without UV radiation at any pH in the range 2-9.

Most preferred is treating the membranes with a solution of hydroxyl radicals prepared from an aqueous solution of transition metal catalyst in conjunction with hydrogen peroxide at a pH of 2-9, with or without UV radiation. Preferably the transition metal catalyst is a mixture of iron II/iron III.

The treatment may involve soaking, filtering or recirculating to cross-link the crosslinkable compound to the polymer matrix. UV light may be used if desired.

Preferably, after crosslinking, the process also includes a step of leaching unbound excess copolymer. The excess unbound copolymer can be washed out with water or any other suitable solvent, for a predetermined time or to a predetermined level of leachate. It is possible that some cross linked material will be washed out, ie some oligomeric and lower polymeric material not fully embedded in the matrix of non-crosslinkable and/or hydrophobic polymer.

According to a third aspect, the invention provides a method of functionalising a polymeric microfiltration or ultrafiltration membrane including:
i) preparing a polymeric microfiltration or ultrafiltration membrane which contains a component which is cross-linkable;
ii) treating said polymeric microfiltration or ultrafiltration membrane with a hydroxyl radical to cross-link said cross-linkable component; and
iii) leaching, where present, any unbound cross linked or unbound cross-linkable component.

According to a fourth aspect, the invention provides a method of increasing the permeability of a polymeric microfiltration or ultrafiltration membrane including:
i) preparing a polymeric microfiltration or ultrafiltration membrane which contains a component which is cross-linkable;
ii) treating said polymeric microfiltration or ultrafiltration membrane with a hydroxyl radical to cross-link said cross-linkable component; and
iii) leaching, where present, any unbound cross linked or unbound cross-linkable component.

According to a fifth aspect the invention provides a porous polymeric microfiltration or ultrafiltration membrane including a cross-linked hydrophilic polymer or copolymer.

Preferably, the cross-linked hydrophilic polymer or copolymer is integrated into a matrix of a porous microfiltration or ultrafiltration membrane also includes a non cross-linked and/or hydrophobic component.

Preferably, the membranes of the present invention are asymmetric membranes, which have a large pore face and a small pore face, and a pore size gradient which runs across the membrane cross section. The membranes may be flat sheet, or more preferably, hollow fibre membranes.

In another aspect, the invention provides a hydrophilic membrane prepared according to the present invention for use in the microfiltration and ultrafiltration of water and waste-water.

In another aspect, the invention provides a hydrophilic membrane prepared according to the present invention for use as an affinity membrane.

In another aspect, the invention provides a hydrophilic membrane prepared according to the present invention for use as protein adsorption.

In another aspect, the invention provides a hydrophilic membrane prepared according to the present invention for use in processes requiring bio-compatible functionalised membranes.

The term "hydrophilic" is relative and is used in the context of a refers to compound which when added to a base membrane component render the overall membrane more hydrophilic than if the membrane did not contain that compound.

BEST METHOD OF PERFORMING THE INVENTION

As mentioned above, the present invention can be carried out upon any polymeric microfiltration or ultrafiltration membrane which contains cross linkable moieties, monomers, oligomers, polymers and copolymers which are capable of cross linking to produce a hydrophilised membrane.

Membranes of the present invention possess the properties expected of hydrophilic membranes. However, unlike other hydrophilised membranes, they show an improved permeability and decreased pressure losses for filtration of any type, but in particular water filtration. This makes them suitable for applications such as filtration of surface water, ground water, secondary effluent and the like, or for use in membrane bioreactors.

Preferably, the cross linking is carried out by hydroxyl radicals generated from an aqueous solution of transition metal ions, in conjunction with hydrogen peroxide under acidic conditions. These conditions are sometimes described as producing Fenton's reagent.

Preferably the transition metal ions are iron II and/or iron II. Preferably, the acidic conditions are a pH of between about pH 2-6.

Any transition metal can be used, not just iron. Molybdenum, chromium, cobalt are also preferred. Any aqueous metal ion or complex that can easily be reduced/oxidised can be used as the catalyst system for the cleaning method of the present invention. Combinations of transition metal ions may also be used, and may be from a variety of sources, and can be supplemented with additional ions or species as necessary.

It has been found that a number of polymeric membranes, including PVdF, have a good resistance to hydroxyl radicals. This is surprising because polymeric membranes such as PVdF are not very stable with respect to ozone, and hydroxyl radicals are considered more powerful oxidising agents than ozone, for example in cleaning organics from fouled membranes. Without wishing to be bound by theory, it is possible that the reason for this may be due to the short lifetime of hydroxyl radicals.

In one preferred embodiment, the solution of hydroxyl radicals is prepared from an aqueous solution of $M^{(n+)}$ and/or $M^{(n+1)+}$ (for example, an iron II and/or iron III system) in conjunction with hydrogen peroxide at a low pH. Starting with either $M^{(n+)}$ and/or $M^{(n+1)+,}$ an appropriate equilibrium between the two species will be reached. For instance, it is possible to start with either ferrous or ferric species, to get an identical catalyst system. Other practicalities may dictate one over the other, for instance, when the metal is iron, preferably iron II species are used to start the reaction because they tend to be more soluble than any corresponding iron III species. Thus, the possibility of undissolved iron III salts is reduced when starting from a solution of iron II.

The invention will be described with respect to iron II and iron III, but it will be understood to apply to any system where hydroxyl radicals are generated.

The general scheme for preparing hydroxyl radicals by the redox catalyst/peroxide/$H^+$ system of the present invention is as shown below. The reaction of either iron II or iron III with hydrogen peroxide is possible, generating the complementary iron species.

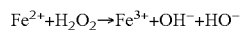
$Fe^{2+}+H_2O_2 \rightarrow Fe^{3+}+OH^-+HO^-$

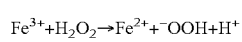
$Fe^{3+}+H_2O_2 \rightarrow Fe^{2+}+{}^-OOH+H^+$

Overall:

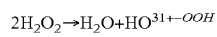
$2H_2O_2 \rightarrow H_2O+HO^{3+-OOH}$

The hydroxyl radical is a strong oxidant, having a relative oxidation power over twice that of chlorine, and being second only to $F^-$ in oxidative strength.

The individual redox catalyst/peroxide/$H^+$ reagent components may be added to the cross linkable membrane together, or preferably separately, directly to the water which surrounds the fibre membranes.

Typically, a concentration less than 300 ppm of Fe can be used. Concentrations as low as 15-20 ppm Fe are efficacious, but the reaction time to achieve the desired degree of crosslinking is longer, for example, in excess of 24 hrs. Preferred concentrations are between 50-5000 ppm $FeSO_4$, and more preferably 300-1200 ppm. Reaction times vary depending on the amount of cross linkable agent present and the concentration of hydroxyl radical available, as well as the temperature. Typical reaction times to achieve cross linking are from 0.5-24 hrs but more preferably 2-4 hrs.

Peroxide concentrations between 100-20000 ppm, more preferably between 400-10000 ppm and more preferably 1000-5000 ppm can be used. It is also preferable to have the ratio of Fe:$H_2O_2$ between 1:4 and 1:7.5, and more preferably between 1:5-1:25.

Preferably pH is in the range 2-6, more preferably 3-5.

A typical the redox catalyst/peroxide/$H^+$ system of the present invention had a concentration of 0.12 wt % $FeSO_4$ at pH2, and a peroxide concentration of between 5000 ppm and 9000 ppm.

The $H_2O_2$ can be added all at once, however, it is usually preferred if the $H_2O_2$ is added over the period of the reaction. For example, in the case of a 4000 ppm $H_2O_2$ concentration for a duration of 4 hours, $H_2O_2$ would be added at approximately 1000 ppm per hour.

Sodium hydrogen sulphate (NaHSO4) can be used to control the pH. Alternatively, any acid can be used, provided that the pH is in a suitable range. Citric acid or sulfuric acid can be used, either alone or buffered with a base, for example, NaOH, to get the desired pH. In one preferred embodiment, the pH is controlled by a sulfuric/caustic combination or sulfuric/sodium hydrogen sulfate combination. In highly preferred embodiments, pH is controlled by the use of citric acid, either alone or in combination with other species. Chloride ions can be present, e.g. in the form of $FeCl_3$ or HCl.

The microfiltration/ultrafiltration membrane containing PVdF and uncross-linked PVP was immersed in an aqueous solution of ferric chloride/hydrogen peroxide and sodium hydrogensulfate and allowed to contact the stirred solution at room temperature for 4 hours before being removed and rinsed with distilled deionized water.

The washing was continued until no further material leached out in the wash. The crosslinkable component is preferably PVP. The crosslinkable component is preferably present in the membrane in an amount of 0.1-10 wt %, more preferably 2-7 wt %. It is highly preferable if the crosslinkable component is 0.1-10 wt % PVP, more preferably 2-7 wt % PVP.

As illustrated in the table and examples below, the only property of the membrane which is Substantially affected by the method of the present invention is permeability.

Thus, it is possible to improve the permeability (flux) of the membrane without sacrificing the pore size or mechanical integrity. This is achieved by cross-linking and also some leaching of the "cross-linkable component", as explained earlier. The following examples illustrate the difference in permeability between the unmodified The improved properties of membranes containing components cross-linked via hydroxyl radicals are illustrated in the following examples.

PVDF membranes containing a cross-linkable component were treated with solutions of 1 wt % $H_2O_2$ or Fenton's reagent. The Fenton's reagent had the concentration as follows:

0.12 wt % $FeSO_4.7H_2O$
0.1 wt % $NaHSO_4$
0.9 wt % $H_2O_2$

The method for treating the membranes was as follows:
1. Wash membranes in RO water (1 hr)
2. Immerse membranes in treatment solution for specified time
3. Rinse membranes in RO water (1 hr)
4. Immerse membranes in 20 wt % glycerol (aqueous)
5. Dry membranes at room temperature The results are given in Table 1. Peroxide treatment to effect crosslinking increased permeability by about 20%, with only a slight reduction in break extension.

The use of Fenton's reagent as a crosslinking agent showed that after 1 hour, a 30% increase in permeability was obtained, with only a slight reduction in the break extension (from 179% to 169%), so the membrane was still highly flexible.

Longer treatment with Fenton's led to a loss in break extension, down to around 120%, which is nevertheless quite flexible. There was however a dramatic increase in the permeability—around a 200% increase in permeability over the untreated membrane.

There was otherwise no change in the morphology of the membranes resulting from either the Fenton's or peroxide cross-linking procedures.

TABLE 1

| Property | Unmodified membrane | $H_2O_2$ Treated membrane | Modified Membrane Fenton's reagent | | |
|---|---|---|---|---|---|
| Treatment Time | | 1 hr | 1 hr | 1.3 hr | 3 hr |
| Outside Diameter | 800 μm | 800 μm | 800 μm | 800 μm | 800 μm |
| Inside Diameter | 500 μm | 500 μm | 500 μm | 500 μm | 500 μm |
| Pore size (by SEM) | <0.1 μm | <0.1 μm | <0.1 μm | <0.1 μm | <0.1 μm |
| Permeability | 192 lmh/bar | 233 lmh/bar | 252 lmh/bar | 373 lmh/bar | 583 lmh/bar |
| Bubble point | 400-450 kPa | 400-450 kPa | 400-450 kPa | 400-450 kPa | 400-450 kPa |
| Break Extension | 179% | 123% | 169% | 122% | 120% |
| Wets with water? | Yes | Yes | Yes | Yes | Yes |

The following illustrates the cross-linking ability of hydroxyl radicals.

Samples of PVP K90 (10 wt %) and PVP K120 (9.3 wt %) were dissolved separately in RO water adjusted to pH 2 using $NaHSO_4$. $FeCl_2$ (0.04 wt %) was added and the solution was thoroughly mixed. $H_2O_2$ (0.32 wt %) was then added to the mixture, and a gel was immediately formed upon addition. This experiment was repeated with PVP K120 solutions ranging from 2.5-20 wt %, but replacing $FeCl_2$ with $FeSO_4.7H_2O$.

Insoluble gel was formed in each case with the exception of 2.5 wt % solution. It is believed that this concentration is too low as the sole component in a solution to form an insoluble gel. However the solution visibly increased in viscosity, suggesting some cross-linking is occurring.

Membranes made according to the present invention possess improved porosity and permeability properties, increasing the ability of the membrane to filter water. However, the membranes according to the present invention retain equivalent pore size, good pH (acid and base) and oxidation (Chlorine) resistant properties of the unmodified membranes in a filtration process.

The present invention provides improved permeability or porosity without sacrificing pore size or mechanical integrity.

While the invention has been described with reference to particular embodiments, it will be understood by those skilled in the art that the inventive concept disclosed herein is not limited only to those specific embodiments disclosed.

The claims of the invention are as follows:

1. A method of forming a hydrophilic polymeric microfiltration or ultrafiltration membrane comprising the steps of:
    preparing a dope comprising a polymeric material comprising polyvinylidene fluoride and a cross-linkable component;
    preparing a polymeric microfiltration or ultrafiltration membrane from the dope; and
    treating the polymeric microfiltration or ultrafiltration membrane at a pH in the range of 2.0-9.0 with a hydroxyl radical generated by an aqueous solution comprising a transition metal catalyst, hydrogen sulfate, and hydrogen peroxide to cross-link said cross-linkable component.

2. The method according to claim 1, wherein the transition metal catalyst is selected from the group consisting of iron, molybdenum, chromium and cobalt.

3. The method according to claim 2, wherein the transition metal catalyst is iron.

4. The method according to claim 3, wherein the transition metal catalyst is a mixture of iron II and iron III.

5. The method according to claim 1, wherein the cross-linkable component is a hydrophilic cross-linkable component.

6. The method according to claim 1, wherein the cross-linkable component is selected from the group consisting of monomers, oligomers, polymers and copolymers of one or more of the following: vinyl pyrrolidone, vinyl acetate, vinyl alcohol, vinyl methyl ether, vinyl ethyl ether, acrylic acid, methyl acrylate, ethyl acrylate, propyl acrylate, butyl acrylate, methyl methacrylate, ethyl methacrylate propyl methacrylate, butyl methacrylate and maleic anhydride.

7. The method according to claim 1, wherein the cross-linkable component is selected from poly(vinyl pyrrolidone), poly(vinyl acetate) or copolymers of vinyl pyrrolidone and vinyl acetate.

8. The method according to claim 1, wherein the cross-linkable component is added in an amount which produces only a minimal attenuation of the hydrophilicity/hydrophobicity balance of the membrane.

9. The method according to claim 1, wherein the polymeric microfiltration or ultrafiltration membrane comprises a non-cross-linkable component.

10. The method according to claim 9, wherein the non-cross-linkable component is a polymer or a copolymer of oxidation resistant material.

11. The method according to claim 9 wherein the non-cross-linkable component is a polymer or a copolymer resistant to base attack.

12. The method according to claim 9 wherein the non-cross-linkable component comprises a monomer selected from the group consisting of chlorotrifluoroethylene, vinyl fluoride, vinyl chloride, vinylidene fluoride/vinylidene chloride/hexafluoropropylene, ethylene-chlorotrifluoroethlyene, and tetrafluoroethylene.

13. The method according to claim 1, wherein the hydrogen sulfate comprises sodium hydrogen_sulfate ($NaHSO_4$).

14. The method according to claim 1, wherein treating the polymeric microfiltration or ultrafiltration membrane with a hydroxyl radical generated by an aqueous solution comprising a transition metal catalyst and hydrogen peroxide comprises treating the membrane with a hydroxyl radical generated by an aqueous solution comprising ferric chloride, hydrogen peroxide and sodium hydrogensulfate.

15. The method according to claim 1, wherein the aqueous solution further comprises sulphuric acid.

16. The method according to claim 1, wherein further comprises citric acid.

17. The method according to claim 1, further comprising applying ultraviolet radiation.

18. The method according to claim 1, comprising at least one of soaking, filtering, or recirculating to cross-link the cross-linkable compound to the polymer matrix.

19. The method according to claim 1, further comprising, after cross-linking, leaching an unbound amount of the cross-linkable component from the porous polymeric microfiltration or ultrafiltration membrane.

20. The method according to claim 19, wherein leaching further comprises leaching with water.

21. The method according to claim 19, wherein leaching further comprises leaching with a solvent compatible with the cross-linkable component.

22. The method according to claim 19, wherein leaching further comprises leaching for a predetermined period of time.

23. The method according to claim 19, wherein leaching further comprises leaching using a predetermined level of leachate.

* * * * *